United States Patent [19]

Cumming et al.

[11] Patent Number: 5,132,041

[45] Date of Patent: Jul. 21, 1992

[54] LIQUID CRYSTAL COMPOUNDS HAVING ETHER TAIL MOIETY

[75] Inventors: William J. Cumming, Chelmsford, Mass.; Russell A. Gaudiana, Merimack, N.H.; Cynthia McGowan, Stoneham, Mass.; Richard A. Minns, Arlington, Mass.; Alaric Naiman, Cambridge, Mass.

[73] Assignee: Polaroid Corporation, Cambridge, Mass.

[21] Appl. No.: 61,072

[22] Filed: Jun. 23, 1987

Related U.S. Application Data

[63] Continuation-in-part of Ser. No. 887,620, Jul. 21, 1986, abandoned.

[51] Int. Cl.$^5$ .............. C09K 19/12; C09K 19/22; C09K 19/20
[52] U.S. Cl. ............ 252/299.65; 252/299.66; 252/299.67; 252/299.68; 359/103; 560/59
[58] Field of Search ............ 252/299.65, 299.66, 252/299.67, 299.68, 299.01; 350/350 S; 560/59

[56] References Cited

U.S. PATENT DOCUMENTS

| Re. 31,715 | 10/1984 | Coates et al. | 350/246 |
|---|---|---|---|
| 4,149,413 | 4/1979 | Gray et al. | 73/356 |
| 4,257,911 | 3/1981 | Gray et al. | 252/299 |
| 4,556,727 | 12/1985 | Walba | 560/73 |
| 4,564,694 | 1/1986 | Hirai et al. | 560/1 |
| 4,576,732 | 3/1986 | Isogai et al. | 252/299.65 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,633,012 | 12/1986 | Taguchi et al. | 252/299.68 |
| 4,650,600 | 3/1987 | Heppke et al. | 252/299.65 |
| 4,710,585 | 12/1987 | Taguchi et al. | 252/299.65 |
| 4,725,688 | 2/1988 | Taguchi et al. | 252/299.01 |
| 4,780,242 | 10/1988 | Miyazawa et al. | 252/299.65 |

FOREIGN PATENT DOCUMENTS

| 219958 | 4/1987 | European Pat. Off. | 252/299.65 |
|---|---|---|---|
| 58-135837 | 8/1983 | Japan |  |
| 61-76449 | 4/1986 | Japan |  |
| 61-129151 | 6/1986 | Japan |  |

OTHER PUBLICATIONS

G. W. Gray, et al., Liquid Crystals & Plastic Crystals, vol. 1, pp. 142-143 (1974).
G. DeCobert et al., Mol. Cryst. Liq. Cryst. 1984, vol. 114, pp. 237-247.
R. B. Meyer, et al., "Ferroelectric Liquid Crystals", J. De Phys. Lett. 36, 69-71, 1975.
N. A. Clark et al., Appl. Phys. Lett. 36 (11) Jun. 1, 1980.
J. W. Goodby et al., Liquid Crystal and Ordered Fluids, Edited by A. C. Griffin and J. F. Johnson, Plenum Press, vol. 4, pp. 1-32 (1984).
T. Kitamura et al., "Study of New Liquid Crystal Materials (11): Synthesis and Mesomorphic Properties of Alkoxymethylene Substituted Phenyl Cyclohexanecarboxylates", Mol. Cryst. Liq. 1984, vol. 112, pp. 319-324.
T. Kitamura, et al., "Synthesis and Physical Properties of Alkoxymethylene Substituted Phenyl Cyclohexanecarboxylates", Mol. Cryst. Liq. Cryst., 1985, vol. 130, pp. 231-247.

Primary Examiner—Robert L. Stoll
Assistant Examiner—C. Harris
Attorney, Agent, or Firm—Louis G. Xiarhos

[57] ABSTRACT

Disclosed are smetic liquid crystal compounds exhibiting ferroelectric behavior and having the formula $R^1(OR^2)_aO(R^3)_bZ—R^*$ wherein $R^1$ is alkyl or alkoxyalkyl, $R^2$ and $R^3$ are each alkylene, a is an integer of at least one, b is zero or one, $R^*$ is an optically active group containing an asymmetric center and —Z— is an organic divalent core radical having parallel or coaxially extending bonds at the terminal ends thereof, the core radical having an axial ratio of at least two and being characterized by an essentially rigid and flat molecular structure. Presence of the ether-interrupted hydrocarbon tail moiety at the terminal end of the compounds provides a lowering in observed temperatures of phase transition.

39 Claims, No Drawings

LIQUID CRYSTAL COMPOUNDS HAVING ETHER TAIL MOIETY

REFERENCE TO RELATED APPLICATION

This application is a continuation-in-part of our co-pending and commonly assigned application, U.S. Ser. No. 887,620, filed Jul. 21, 1986, and now abandoned.

BACKGROUND OF THE INVENTION

This invention relates to certain liquid crystal compounds of the smectic type. More particularly, it relates to smectic liquid crystals which exhibit a ferroelectric, chiral smectic C phase and which find application in electrooptic display devices.

The utilization of the properties of a ferroelectric smectic phase to effect a switching phenomenon in an electrooptic display device has been known and is described by N. A. Clark and S. T. Lagerwall in App. Phys. Lett. 36, 899 (1980). Such devices operate with low electric power consumption while providing a more rapid switching than is realized in electrooptic display devices dependent upon the properties of liquid crystals of the nematic type. Display devices of the ferroelectric type rely upon two tilted configurations of smectic liquid crystal molecules to provide two states of equal energy. Switching from one state to the other is accomplished by moving a boundary between the two domains by applying an electric field across a pair of electrodes sandwiching a layer of the ferroelectric liquid crystal material.

Examples of ferroelectric liquid crystal compounds of the smectic type are described, for example, by G. Decobert and J. C. Dubois in Mol. Cryst. Liq. Cryst., 1984, 114, 237-247; by J. W. Goodby and T. M. Leslie in Liquid Crystals and Ordered Fluids, Edited by A. C. Griffin and J. F. Johnson, Plenum Press, Vol. 4, pp. 1-32; and in European Patent Application 0110299 A2, published Jun. 13, 1984. In the aforementioned European Patent Application 0110299 A2, it is indicated that the appearance of ferroelectricity in a molecular structure is dependent upon two conditions—the presence of an optically active group and the presence of an electric dipole in a direction approximately perpendicular to the major axis of the liquid crystal molecule, to induce spontaneous polarization. In general, it is well recognized that the suitability and operating efficiency of an electrooptic device will be dependent upon the chemical structure of a liquid crystal compound employed therein and that such properties will be influenced by such molecular factors as rigidity or stiffness, morphology, crystallinity and intermolecular forces.

In the production of ferroelectric liquid crystal compounds of the smectic type for application in ferroelectric devices, it will be advantageous if the ferroelectric liquid crystal material shows a smectic phase over a wide range of temperatures including room temperature. Accordingly, there is an interest in ferroelectric, smectic liquid crystal compounds and compositions which can over a range of temperatures be employed in an electrooptic device for high-speed optical switching, particularly at room temperature.

SUMMARY OF THE INVENTION

The present invention provides a class of smectic liquid crystal compounds which exhibit their ferroelectric character over a range of temperatures and is based upon the discovery that the phase transitions observed in a ferroelectric liquid crystal compound can be lowered by including at the terminal end of the compound an ether-interrupted hydrocarbon tail moiety. There is, thus, provided a class of smectic liquid crystal compounds characterized by reduced phase-transition temperatures and having the formula (I)

wherein $R^1$ is alkyl or alkoxyalkyl, $R^2$ and $R^3$ are each alkylene, a is an integer of at least one, b is zero or one, $R^*$ is an optically active group containing an asymmetric center and —Z— is an organic divalent core radical having parallel or coaxially extending bonds at the terminal ends thereof, the core radical having an axial ratio of at least two and being characterized by an essentially rigid and flat molecular structure.

DETAILED DESCRIPTION OF THE INVENTION

The liquid crystal compounds of the present invention will typically show a ferroelectric phase which, as used herein, refers to a smectic phase such as a chiral smectic I phase, a chiral smectic H phase or a chiral smectic C phase (which phases are referred to respectively, by the abbreviations $S_I^*$, $S_H^*$ and $S_C^*$). The smectic liquid crystal compounds of the invention can be used as ferroelectric liquid crystal compounds in a ferroelectric device or can be employed in admixture with other liquid crystal compounds to provide mixtures exhibiting ferroelectric behavior. Preferred liquid crystal compounds of the invention will be those which exhibit the chiral smectic C ($S_C^*$) phase especially suited to the provision of compositions useful in ferroelectric display devices.

The smectic liquid crystal compounds of the invention have the formula

wherein $R^1$ is a straight or branched-chain alkyl group (such as ethyl or n-butyl) or is alkoxyalkyl (e.g., 2-butoxyethyl); each of $R^2$ and $R^3$ is a divalent alkylene radical (e.g., ethylene); a is an integer of at least one (e.g., an integer of from 1 to 3); b is zero or one; $R^*$ is an optically active group containing an asymmetric center; and —Z— is a divalent core radical of the smectic liquid crystal compound.

From inspection of formula (I), it can be seen that the smectic liquid crystal compounds of the invention may be considered to comprise a pair of "tail" moieties, of formulas (Ia) and (Ib), respectively,

and

attached to a divalent "core segment" represented as —Z— in formula (I). The nature of each of the respective tail and core moieties contributes importantly to the properties observed in a smectic liquid crystal compound of the invention and is described in greater detail hereinafter.

The core segment $$-Z- \tag{Ic}$$

can vary in its structural configuration as is typically the case in known liquid crystal compounds of the smectic type. In general, the core segment will include at least one aromatic group and the molecular geometry of the core segment will be such as to provide an essentially rigid, inflexible and flat core structure having parallel or coaxially extending terminal bonds, to which the formula (Ia) and (Ib) tail moieties are attached. The axial ratio of the core segment will be equal or greater than two, i.e., the length of the rod-like core segment will be at least twice the mean diameter of the segment. Typically, the core segment will comprise two or more aromatic radicals directly or indirectly connected in a para- orientation and in an essentially coplanar configuration with respect to each other so as to provide an essentially flat or ribbon-like conformation or structure in the core segment. Generally, the atoms which make up the core segment will be interconnected through linking groups which contribute to the essentially inflexible and rigid character of the rod-like core segment and the nature of the core segment will be such as to enhance or at least not diminish the transverse component of the dipole moment of the liquid crystal compound.

Core segments representative of $$-Z- \quad (Ic)$$

in the liquid crystal compounds of formula (I) can be described by reference to the following formula (II)

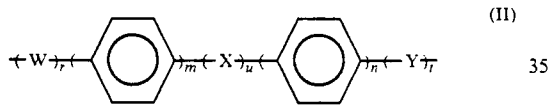

(II)

wherein each of X and Y is a divalent radical selected

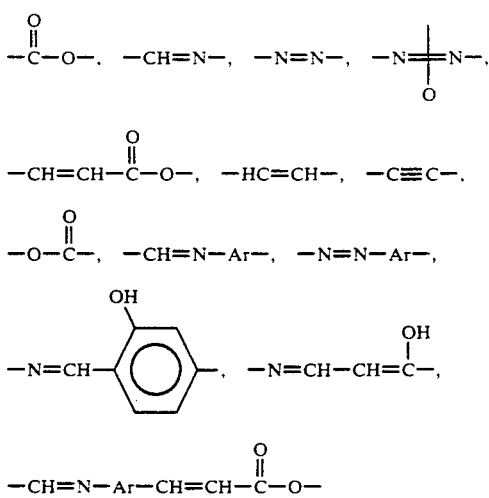

(wherein in each case Ar is p-phenylene or p,p'-biphenylene); each of u and t is zero or one, and the sum of u and t is one or two; each of m and n is zero or an integer one or two, and the sum of n and m is from one to three; W is a divalent radical

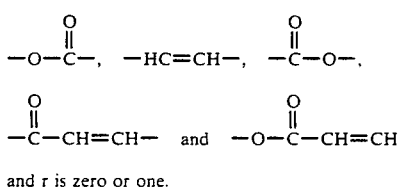

and r is zero or one.

Suitable examples of core radicals of the type represented by formula (II) include the following

(II-a)

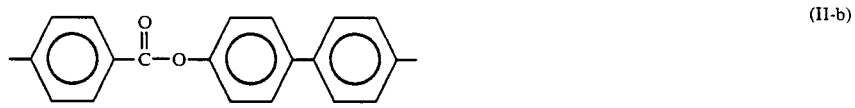

(II-b)

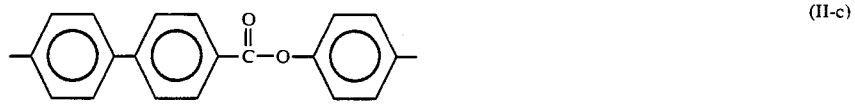

(II-c)

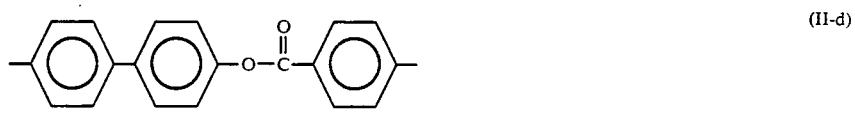

(II-d)

(II-e)

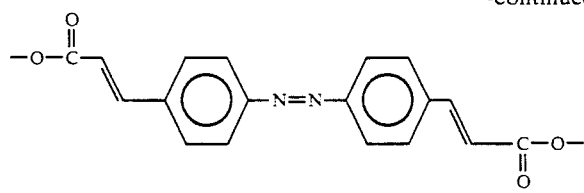
(II-f)

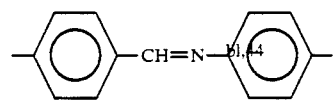
(II-g)

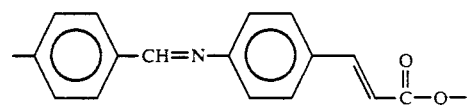
(II-h)

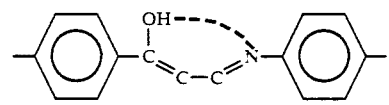
(II-i)

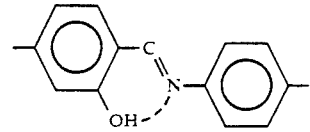
(II-j)

(II-k)

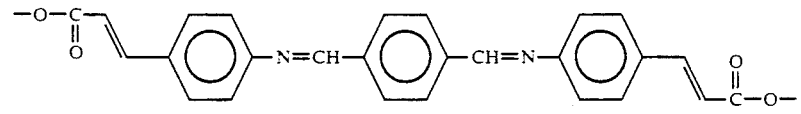
(II-l)

It will be appreciated from the illustrated core radicals that the terminal bonds thereof can be coaxially extending, i.e., the terminal bonds can extend along the same axis as the main axis of the core. Alternatively, the bonds can extend in a parallel fashion, i.e., they can be displaced from the main axis, as is the case in the core radicals of formulas (II-f), (II-h), (II-i), (II-j) and (II-l). The illustrated radicals are of types previously employed in smectic liquid crystal compounds and other cores can be employed, if desired.

The smectic liquid crystal compounds of the invention contain a chiral tail moiety $$-R^*  \quad (Ib)$$

attached to a terminal bond of the core radical. This tail moiety contains an essential asymmetric center. Typically, the optically active group will be an alkyl or alkoxy group having an asymmetric carbon atom such as is represented by the formula (III)

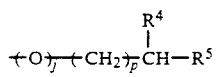  (III)

wherein j is zero or one, p is zero or an integer from 1 to 8 and wherein each of $R^4$ and $R^5$ is alkyl (e.g., methyl or ethyl), halogen (e.g., chloro or bromo), alkoxy (e.g., methoxy, ethoxy) or alkoxyalkyl (e.g., 2-ethoxyethyl or 2-butoxyethyl), provided that $R^4$ and $R^5$ are different from each other. Preferably p will be zero or one and each of $R^4$ and $R^5$ will be dissimilar normal-alkyl groups. Suitable examples of formula (Ib) optically active groups include

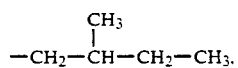

i.e., 2-methylbutyl;

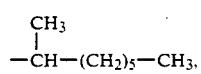

i.e., the 2-octyl group; and 2-methyl butoxy. Other groups having an asymmetric carbon atom can be employed, although the 2-octyl, 2-methylbutyl and 2-methylbutoxy groups will be preferred from the standpoints of ready availability of starting materials and ease of preparative routes.

The ether tail represented by the formula

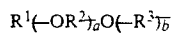  (Ia)

provides an essential function in lowering the phase transition temperatures observed in smectic liquid crystal compounds. In the ether tail of formula (Ia), $R^1$ represents alkyl (e.g., methyl, ethyl, propyl, butyl) or alkoxyalkyl which refers to an alkyl group interrupted by one or more oxygen atoms. Alkoxyalkyl groups include groups of the formula

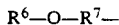
$R^6-O-R^7-$ wherein $R^6$ is alkyl, such as methyl, ethyl, butyl or octyl, and $R^7$ is alkylene, such as methylene, or preferably, ethylene. Other alkoxyalkyl groups include $CH_3-O-CH_2-CH_2-O-CH_2-CH_2-$; $CH_3-CH_2-O-CH_2-O-CH_2-CH_2-$; and $CH_3-(CH_2)_3-O-CH_2-CH_2-O-CH_2-CH_2-$. Preferably, $R^1$ will be short-chain alkyl having from 1 to about 4 carbon atoms.

Each of $R^2$ and $R^3$ in the formula (Ia) ether tail is a divalent alkylene radical, such as methylene or ethylene. Preferably, $R^2$ and $R^3$ will be 1,2-ethylene and can be conveniently incorporated into the ether tail by known synthetic oxyalkylation methods based upon ethylene oxide. Other alkylene radicals can be employed.

The subscript "a" represents an integer of at least one and can be in the range of from one to about 4. Preferably, "a" will be one or two, which in the ether tail of the following formula

$R^1+OR^2\!\!\!\!/_{\overline{a}}O+R^3\!\!\!\!/_{\overline{b}}$     (Ia)

assures that the tail will be, respectively, at least a diether or triether tail. The subscript "b" can be zero or one. When "b" is zero, it will be seen that the ether tail will be bonded via an oxygen atom to the core radical; and when "b" is one, the tail will be bonded via an alkylene radical to the core radical. The choice of "b" as zero or one will depend upon the particular core radical desired in the liquid crystal compound and upon synthetic considerations. In general, it will be preferred from the standpoint of synthesis that "b" be zero.

Preferred ether tails include the diether tail of formula (Ia) wherein a is one, b is zero, $R^1$ is n-butyl and $R^2$ is 1,2-ethylene; and the triether tails wherein a is two, b is zero, $R^2$ is 1,2-ethylene and $R^1$ is ethyl or n-butyl, represented, respectively, by the following formulas:

$C_4H_9-O-C_2H_4-O-$     (IV)

$C_2H_5-O-C_2H_4-O-C_2H_4-O-$     (Va)

$C_4H_9-O-C_2H_4-O-C_2H_4-O-$     (Vb)

The preferred tails can be readily appended to core radicals generally used in the synthesis of smectic liquid crystal compounds and provide significant phase transition temperature reductions, relative to corresponding smectic liquid crystal compounds having an alkoxy group in place thereof.

A preferred class of smectic liquid crystal compounds represented by formula (I) includes the smectic liquid crystal cinnamate compounds of the formula (VI)

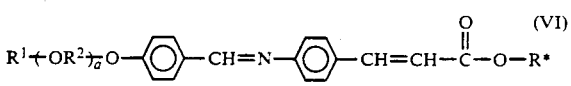
(VI)

wherein $R^1$, $R^2$, $R^*$ and a have the meanings previously defined. Preferably, however, $R^1$ will be alkyl such as methyl, ethyl or butyl; $R^2$ will be 1,2-ethylene; a will be one or two; and $R^*$ will be

(III)

wherein j is zero or one, p is zero or an integer from 1 to 8, especially one, and $R^4$ and $R^5$ are each dissimilar alkyl groups (e.g., methyl and ethyl, respectively).

The preferred cinnamate compounds can be conveniently prepared by a Schiff's base addition reaction route according to the following representative scheme:

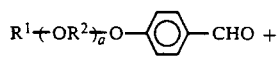
(VIc)

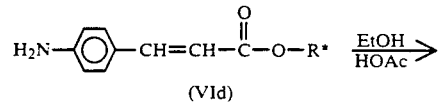
(VId)

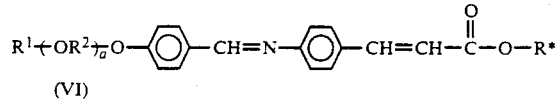
(VI)

The Schiff's base reaction can be accomplished according to known methodology using a solvent such as ethanol (EtOH) and acetic acid (HOAc) catalysis. The formula (VIc) intermediate can be prepared via an etherification reaction (from hydroxybenzaldehyde, bromoalkane ether and alkali metal carbonate in acetonitrile), according to the following scheme:

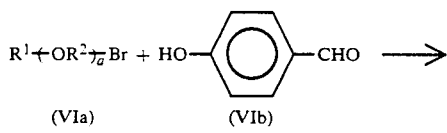
(VIa)      (VIb)

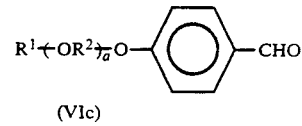
(VIc)

Another preferred class of smectic liquid crystal ester compounds of the invention is represented by the formula

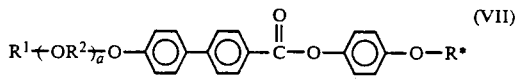
(VII)

wherein $R^1$, $R^2$, $R^*$ and a are defined as in the case of the cinnamate compounds of formula (VI). The ester compounds can be prepared by the following reaction scheme:

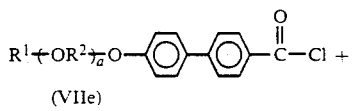

(VIIe)

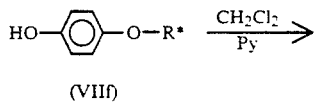

(VIIf)

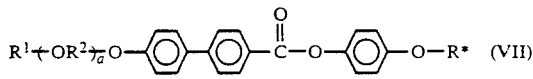  (VII)

The esterification can be accomplished in an organic solvent such as dichloromethane (CH$_2$Cl$_2$) using an acid acceptor such as pyridine (Py) as illustrated above. The acid chloride intermediate of formula (VIIe) can be prepared from 4-hydroxy-4'-cyano-biphenyl by resort to the following illustrative alkylation and hydrolysis steps (Steps 1 and 2) and conversion to the acid chloride (Step 3):

Step 1:

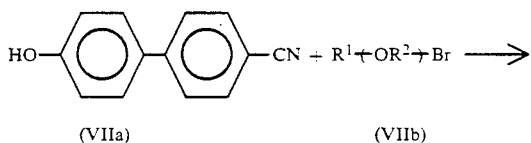

(VIIa)  (VIIb)

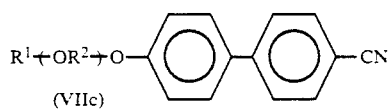

(VIIc)

Step 2:

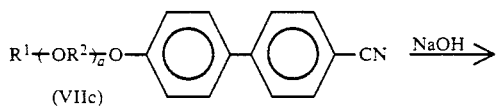

(VIIc)

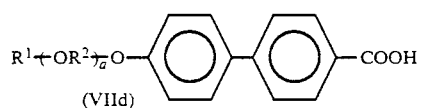

(VIId)

Step 3:

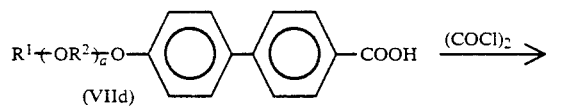

(VIId)

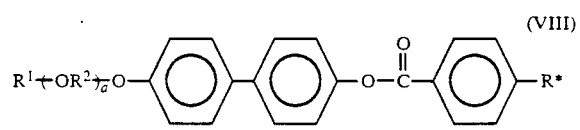

(VIIe)

Another preferred class of smectic liquid crystal ester compounds of the invention is represented by the following formula (VIII)

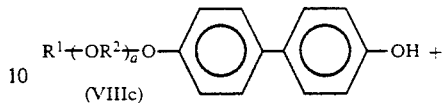

wherein each of $R^1$, $R^2$, $R^*$ and a has the meanings provided hereinbefore in connection with the compounds of formulas (VI) and (VII). These ester compounds can be provided by the following esterification scheme:

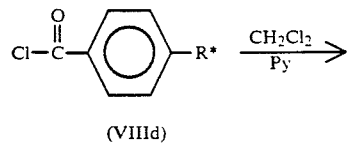

(VIIIc)

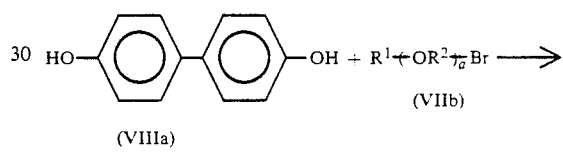

(VIIId)

(VII)

The reaction intermediate of formula (VIIIc) can be provided via the following representative alkylation scheme:

HO—⌬—⌬—OH + R$^1$+OR$^2$+$_a$Br ⟶

(VIIIa)  (VIIb)

R$^1$+OR$^2$+$_a$O—⌬—⌬—OH  (VIIIc)

The ferroelectric liquid crystal compounds of the invention can contain substituent atoms provided that the substituents do not adversely affect the capacity of the liquid crystal material to show ferroelectricity or otherwise negate use of the material in a ferroelectric device. For example, one or more hydrogen atoms in an aromatic nucleus can, if desired, be replaced with a substituent group such as alkyl, halo (e.g., chloro, bromo, iodo, fluoro), nitro, or the like, subject to the aforementioned limitations.

Fluorine-substituted core materials can be employed, if desired, for enhancement of spontaneous polarization values. Smectic liquid crystal ester compounds having a fluorine-atom substituent on the core segment are disclosed and claimed in the copending patent application of W. J. Cumming, et al., U.S. Ser. No. 061,071, filed of even date.

It will be appreciated that structural variations within the class of liquid crystal compounds represented by formula (I) will produce corresponding variations in observed phase transitions, spontaneous polarization and other properties, and such differences will be observed among classes of liquid crystal compounds having core segments of different type and structure. Substantial improvement (lowering) of phase transition temperatures can be observed in smectic liquid crystal compounds having different types of core segments, as a result of the presence of the ether tail moiety. Depending upon the particular nature of the core segment and the chiral and ether tails, the observed lowering of phase transitions may result in the observation of ferroelectricity in the range of room temperature. In the case, for example, of the known ferroelectric liquid crystal compound of the formula

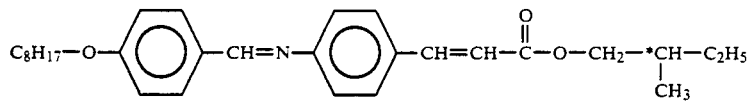

replacement of the octyloxy tail group thereof by an ether tail moiety of the formula (V) in the manner of the present invention, results in a lowering of the smectic C range of temperatures from the range of 75°–93° in the case of the reported compound to the range of 10.6°–24.1° C. in the case of the compound of the present invention.

The smectic liquid crystal compounds of the invention can be employed in the production of a ferroelectric liquid crystal display according to known methodology. A single liquid crystal compound can be employed, although a mixture of liquid crystal compounds will typically be employed. Thus, a mixture of liquid crystal compounds represented by the structure of formula (I), or a mixture of such compounds with liquid crystal compounds of types known in the art, can be employed. The smectic liquid crystal compounds of the invention show bistability and exhibit rapid switching in a display device comprising the liquid crystal material confined, as is known in the art, between a pair of plates having electrodes thereon, and means for applying a voltage across the electrodes.

Among liquid crystal compounds of the invention having ether and chiral tails attached to an essentially flat and ribbon-like core segment are the following exemplary liquid crystal compounds.

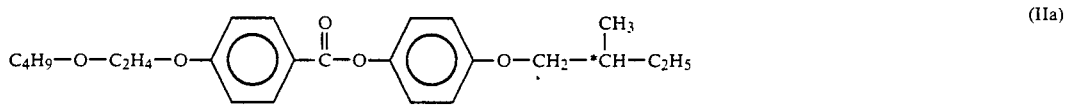

(IIa)

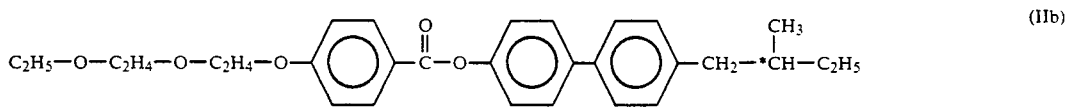

(IIb)

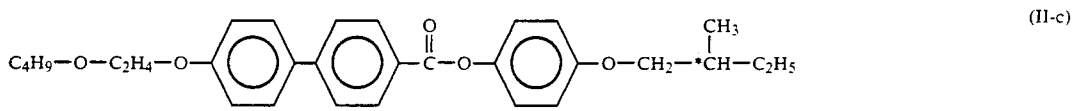

(II-c)

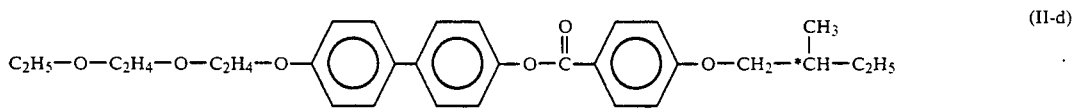

(II-d)

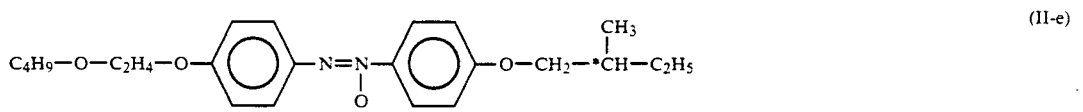

(II-e)

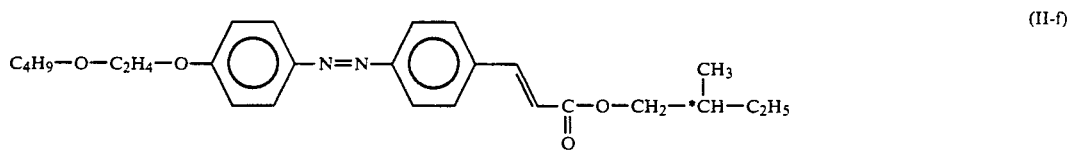

(II-f)

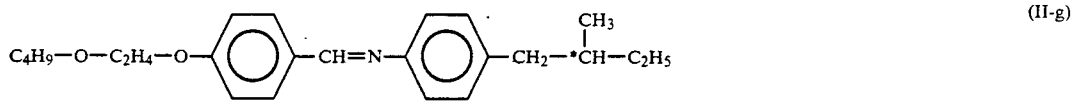

(II-g)

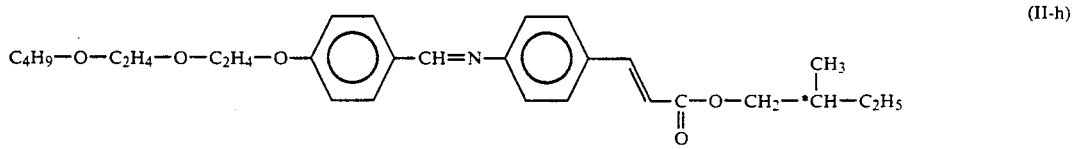

(II-h)

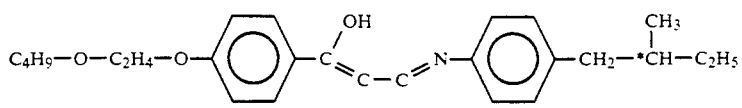
(II-i)

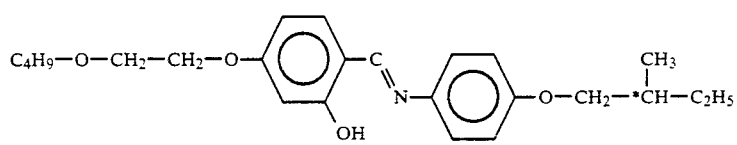
(II-j)

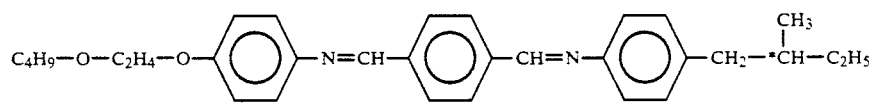
(II-k)

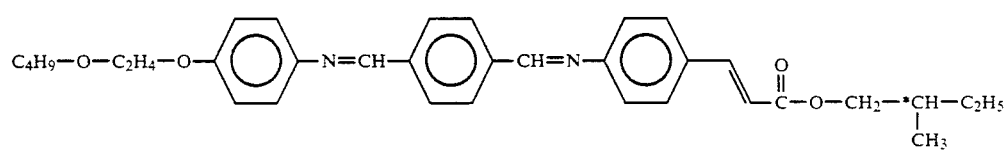
(II-l)

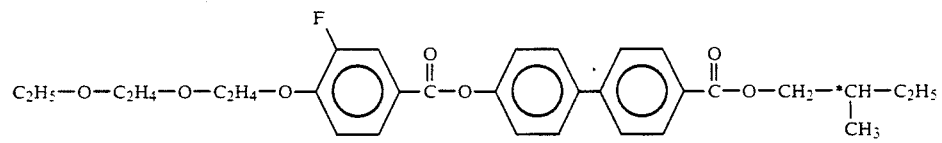
(II-m)

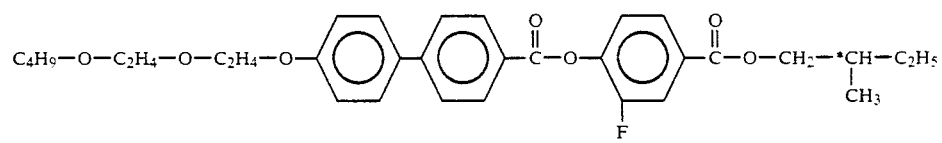
(II-n)

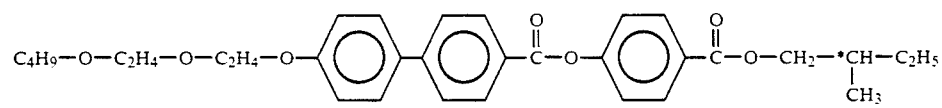
(II-o)

The following non-limiting examples are illustrative of the practice of the present invention.

EXAMPLE 1

This example illustrates the preparation of the Schiff's base adduct of 4-(2-butoxyethoxy)-benzaldehyde and (+)-2-methylbutyl 4-aminocinnamate.

PART A—Preparation of 4-(2-butoxyethoxy)benzaldehyde

Nine grams (0.05 mole) of 1-bromo-2-butoxy-ethane and 6.1 grams (0.05 mole) of 4-hydroxybenzaldehyde were dissolved in 75 mls. of acetonitrile. Into the mixture were added 13.8 grams (0.1 mole) of finely ground potassium carbonate and the resulting reaction mixture was stirred under reflux for ten hours. The reaction mixture was allowed to cool, was filtered, washed with acetonitrile and evaporated to an amber oily product. The product was passed through a silica gel chromatographic column for recovery of a colorless oil (64% yield) having the following structure:

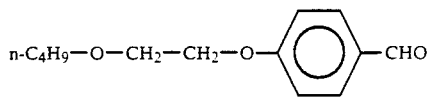

PART B—Preparation of the Schiff's Base Adduct

One-half gram (2.3 millimoles) of 4-(2-butoxyethoxy)-benzaldehyde, prepared as described in PART A of this example, and 0.54 gram (2.3 millimoles) of (+)-2-methylbutyl 4-aminocinnamate were dissolved in 3 mls. of absolute ethanol. One drop of acetic acid was added to the reaction mixture which was stirred at room temperature for one to two hours. Precipitate formation was observed early in the reaction. When the reaction was complete (as judged by no further apparent precipitate formation), the reaction mixture was filtered. The solid product was washed with cold absolute ethanol and was recrystallized several times from isopropanol to yield (approximately 70%) a pale-yellow platelet-like product. The following structure was confirmed by elemental, nuclear magnetic resonance (NMR), infrared (IR) and mass spectral analyses:

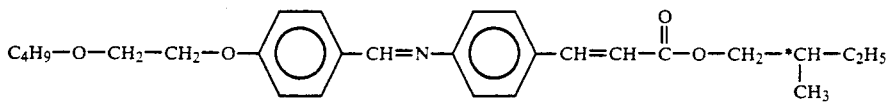

EXAMPLE 2

This example illustrates the preparation of the 4-[(S)-2-methyl-1-butoxy]phenyl ester of 4-[2-(2-ethoxyethoxy)ethoxy]-4'-biphenylcarboxylic acid.

PART A—Preparation of 4-[2-(2-ethoxyethoxy)-ethoxy]-4'-cyanobiphenyl

To 0.975 grams (five millimoles) of 4-hydroxy-4'-cyanobiphenyl dissolved with 1.08 grams (5.5 millimoles) of 1-bromo 2-(2-ethoxyethoxy)-ethane in 25 mls. of acetonitrile, 1.4 grams (ten millimoles) of finely ground potassium carbonate were added. The reaction mixture was refluxed overnight. Thin layer chromatographic analysis indicated total conversion. The reaction mixture was cooled and filtered and the product was washed with acetonitrile and evaporated to a white solid. The product was recrystallized from isopropanol and dried in vacuo to two grams (93% yield) of a compound having the following formula structure:

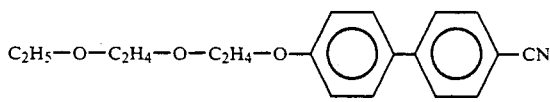

PART B—Preparation of 4-[2-(2-ethoxyethoxy)-ethoxy]-4'-biphenylcarboxylic acid One gram (3.2 millimoles) of the product obtained in the manner described in PART A of this example (the reactant) was placed into a reaction flask to which were added 25 mls. of 10% aqueous sodium hydroxide solution. The mixture was brought to reflux with stirring. The reactant was observed to rest on top of the aqueous base. Ethanol was added until the reaction mixture became homogeneous (approximately 1:1). Within one hour of refluxing, a solid was observed to come out of solution and ammonia evolution was noted. The reaction mixture was allowed to reflux for 12 hours or until cessation of ammonia evolution. White solid material was observed at all times after its initial appearance. The reaction product was acidified with sulfuric acid and was filtered. The product was washed with water until the washings were neutral, for recovery of 1.15 grams (98% yield of a compound having the following formula:

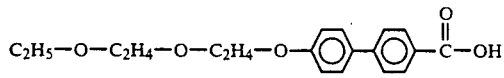

PART C—Preparation of 4-[2-(2-ethoxyethoxy)-ethoxy]-4'-biphenylcarboxylic acid chloride Into a flask was placed one gram (three millimoles) of the product obtained in the manner described in PART B of this example. Ten mls. of oxalyl chloride were added and the reaction mixture was brought to reflux. After two hours, the excess oxalyl chloride was distilled off and the residual product was placed in a vacuum chamber to remove last traces of reaction products. The resulting product (acid chloride) was a grayish solid recovered in the amount of one gram (98% yield) and was used without further treatment in the esterification procedure described in PART E of this example.

PART D—Preparation of 4-[(S)-2-methyl-1-butoxy]phenol

A reaction mixture of hydroquinone (18.2 grams); (S)-(+)-1-bromo-2-methylbutane (4.55 grams); anhydrous potassium carbonate (23 grams); and acetonitrile (250 mls.) was allowed to reflux for 40 hours. Flash chromatography using dichloromethane eluant yielded 2.6 grams (48%) of white crystals exhibiting a Fisher-Johns melting point of 44°-45° C. and having the structure

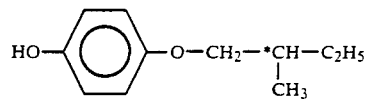

confirmed by TLC, NMR, IR and mass spectral analyses.

PART E—Esterification of 4-[2-(2-ethoxyethoxy)ethoxy]-4'-biphenylcarboxylic acid chloride and 4-[(S)-2-methyl-1-butoxy]phenol A reaction mixture was prepared from one gram (three millimoles) of the acid chloride compound prepared in PART C of this example, 0.54 gram (three millimoles) of the phenol product prepared in PART D of this example, one gram (12 millimoles) pyridine and ten mls. dichloromethane. The reaction mixture was stirred at room temperature overnight and was poured into ice water. After evaporation of the dichloromethane, a solid product was obtained which was triturated several times with water and placed in vacuo to remove last traces of pyridine. Column chromatography on silica gel using a 20/80 mixture of hexane/dichloromethane yielded one gram (66% yield) of an ester having the following structure, as confirmed by TLC, NMR, IR and mass spectral analyses:

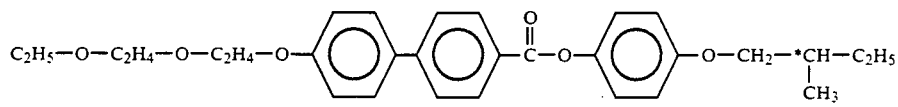

EXAMPLE 3

This example illustrates the preparation of the 4-(2-butoxyethoxy)-4'-hydroxybiphenyl ester of 4-(2methylbutyl)benzoic acid.

PART A—Preparation of 4-(2-butoxyethoxy)-4'-hydroxybiphenyl

One gram (5.5 millimoles) of 1-bromo-2-butoxyethane was combined with 5.5 grams (30 millimoles) of 4,4'-dihydroxybiphenyl in 75 mls. of acetonitrile. To the reaction mixture were added 8.3 grams (60 millimoles) of finely ground potassium carbonate. Stirring was begun and the reaction mixture was brought to reflux and maintained for 48 hours. The reaction product was filtered, washed with acetonitrile and evaporated for removal of solvent. The product was passed through a silica gel chromatographic column using dichloromethane eluent, for recovery of 0.25 gram (20% yield) of a biphenol ether compound having the following formula confirmed by TLC, IR and mass spectral analyses:

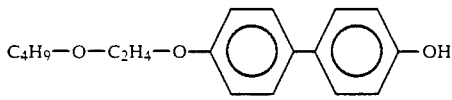

PART B—Esterification of 4-(2-methylbutyl) benzoyl chloride

A reaction mixture was prepared from 0.25 gram (0.91 millimole) of the biphenol ether compound prepared in PART A of this example and 0.25 gram (1.2 millimoles) of (+)-4-(2-methylbutyl) benzoyl chloride in five mls. of pyridine. The reaction mixture was stirred overnight at room temperature, poured into ice water and allowed to stand for ten to twenty minutes. The reaction product was filtered, providing a white solid that was washed with water and dried in vacuo for removal of trace amounts of pyridine. The product was passed through a silica gel chromatographic column using dichloromethane eluant to provide 0.25 gram (60% yield) of ester compound having the following structure confirmed by TLC, NMR, IR and mass spectral analyses:

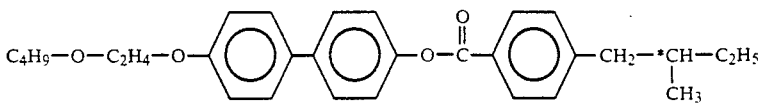

EXAMPLE 4

Using the procedure described in PART A of EXAMPLE 1, there was prepared from 4-hydroxybenzaldehyde and 1-bromo-2-(2-ethoxyethoxy)ethane, the compound p-[2-(2-ethoxyethoxy)ethoxy]benzaldehyde having the structure

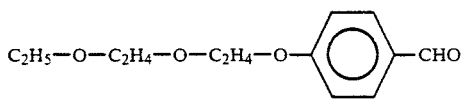

confirmed by TLC, NMR, IR and mass spectral analyses. The compound was reacted with (+)-2-methylbutyl 4-aminocinnamate (using the procedure described in EXAMPLE 1, PART B) to provide the Schiff's base adduct of the following structure, confirmed by TLC, NMR, IR and mass spectral analyses:

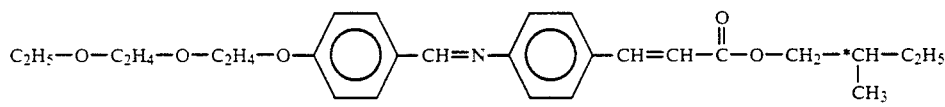

EXAMPLE 5

Using the procedures described in EXAMPLE 2, there was prepared the ester compound having the following structure confirmed by TLC, NMR, IR and mass spectral analyses:

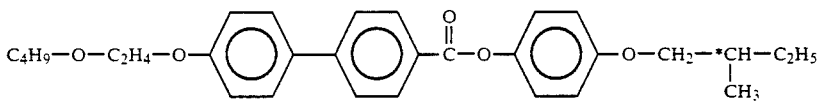

EXAMPLE 6

Using the procedures described in EXAMPLE 3, there was prepared an ester compound having the following structure confirmed by TLC, NMR, IR and mass spectral analyses:

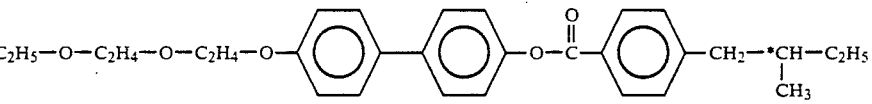

EXAMPLE 7

The example illustrates the preparation of 4-[(S)-2-methyl-1-butoxycarbonyl]-4'-biphenyl 3-fluoro-4-[2-(2-ethoxyethoxy)ethoxy]-benzoate.

PART A—Preparation of methyl 3-fluoro-4-[2-(2-ethoxyethoxy)-ethoxy]-benzoate Into a 500-ml, round-bottom flask equipped with a magnetic stirrer, heating mantle and condenser were placed 5.7 g (33.5 mmol) methyl 3-fluoro-4-hydroxybenzoate, 8.5 g (43.2 mmol) 1-bromo-2-(2-ethoxyethoxy)-ethane, 23.2 g of powdered anhydrous potassium carbonate and 350 ml acetonitrile. After stirring the reaction mixture under reflux for four hours, TLC analysis showed that none of the phenolic starting material remained. Three hundred ml of the acetonitrile was then distilled off and 300 ml dichloromethane was added. The reaction mixture was filtered through Celite and the solids were washed thoroughly with dichloromethane. Evaporation of the filtrate yielded product in the form of a yellow oil. Purification by flash chromatography on silica gel with 4% ethyl ether in dichloromethane, followed by low temperature recrystallization from pentane, yielded 8.55 g of white crystals, 89%, m.p. 33°-36.5° C. The structure was confirmed by infrared, nuclear magnetic resonance and mass spectral analyses.

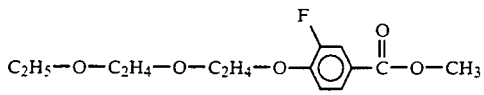

PART B—Preparation of 3-fluoro-4-[2-(2-ethoxyethoxy)-ethoxy-benzoic acid

Into a 500-ml round-bottom flask equipped with magnetic stirrer, heating mantle and condenser were placed 3.15 g of the benzoate ester product prepared as described in PART A of this example, 6 mls of 50% aqueous sodium hydroxide solution and 150 mls of methanol. The reaction mixture was stirred under reflux for three hours. Methanol was distilled off (100 mls) and water (600 mls) was added. The reaction mixture was acidified with hydrochloric acid. After cooling to 0° C., a white solid precipitate was obtained. The white solid was filtered and set aside. The filtrate was extracted with methylene chloride and the extracted material was evaporated to a white solid which was combined with the set-aside material. The combined material was dried under vacuum to yield 2.82 g of product (94% yield) having a melting point of 67°-68° C. The following structure was confirmed by TLC, NMR, IR and mass spectral analyses.

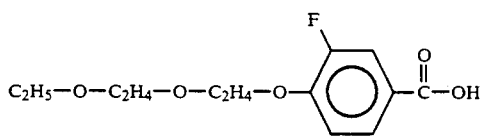

PART C—Preparation of 4-benzyloxy-4'-biphenylcarbonitrile

In a 250-ml, three-necked, round-bottom flask equipped with a magnetic stirrer, heating mantle, thermometer, and condenser were placed 1.76 g. (9.0 mmol) 4-hydroxy-4'-biphenylcarbonitrile, 3.94 g (28.5 mmol) powdered anhydrous potassium carbonate, 1.18 ml (9.92 mmol) α-bromotoluene, and 150 ml acetonitrile. After stirring the mixture under reflux for two hours, TLC analysis showed that none of the phenolic starting material remained. Two-thirds of the acetonitrile was then distilled off, and 200 ml dichloromethane was added. The mixture was filtered through Celite and the solids were washed thoroughly with dichloromethane. Evaporation of the filtrate yielded white crystals which were purified by recrystallization from methanol. 2.17 g (84.4%) of product was obtained; mp 150°-151.5° C. The following structure was confirmed by infrared, nuclear magnetic resonance, and mass spectral analyses.

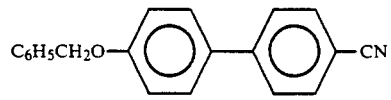

PART D—Preparation of 4-benzyloxy-4'-biphenylcarboxylic acid

In a 250-ml, three-necked, round-bottom flask equipped with a magnetic stirrer, heating mantle, thermometer, and condenser were placed 1.59 g (5.57 mmol) 4-benzyloxy-4'-biphenylcarbonitrile, 15 g sodium hydroxide pellets, and 150 ml 2-methoxyethanol. The mixture was stirred under reflux overnight, then two-thirds of the 2-methoxyethanol was distilled off and 400 ml water was added. After acidification, the product was filtered, washed with water, and dried under vacuum to yield 1.69 g (100%) of 4-benzyloxy-4'-biphenylcarboxylic acid mp>305° C., whose structure was confirmed by mass spectral analysis, as follows.

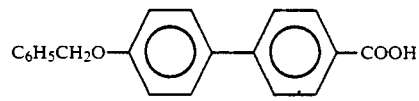

PART E—Preparation of 4-benzyloxy-4'-biphenylcarbonyl chloride

In a 100-ml, three-necked, round-bottomed flask equipped with a magnetic stirrer, an oil bath, and a condenser topped with a drying tube were placed 1.69 g of 4-benzyloxy-4'-biphenylcarboxylic acid, 34 ml of thionyl chloride, and one drop of dimethylformamide. After stirring the solution for three hours under reflux, the thionyl chloride was distilled off, then 75 ml tetrachloromethane was added and distilled. The brown solid was dissolved in 500 ml hot dichloromethane, and the solution was treated with charcoal and filtered through Celite. The solids were washed with hot dichloromethane, and the filtrate was evaporated, to yield the following compound.

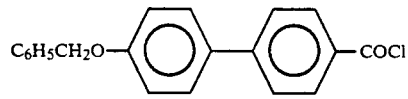

PART F—Preparation of (S)-2-methyl-1-butyl 4-benzyloxy-4'-biphenylcarboxylate In a 100-ml, three-necked, round-bottom flask equipped with a magnetic stirrer and thermometer were placed 3.2 g (36.3 mmol) (S)-(−)-2-methyl-1-butanol, 14 ml distilled pyridine, and a catalytic amount of 4-dimethylaminopyridine (DMAP). After cooling the flask to 0° C. under nitrogen, 1.2 g (3.72 mmol) 4-benzyloxy-4'-biphenylcarbonyl chloride was added and the mixture was stirred for three days at room temperature. It was then poured into 50 ml ice water and extracted with dichloromethane. The organic phase was extracted with 10% aqueous hydrochloric acid, dried over sodium sulfate, filtered, and evaporated to a light brown solid. Purification by flash chromatography on silica gel with dichloromethane followed by low-temperature recrystallization from pentane yielded white crystals (0.99 g, 71.2%, mp 95.5°–97.5° C.) whose structure was confirmed by infrared, nuclear magnetic resonance, and mass spectral analyses, as follows.

The solids were washed in 90 mls of methylene chloride (dried over 5A molecular sieves). The reaction mixture was stirred at room temperature for 65 hours. Thin layer chromatographic analysis of the reaction mixture showed no phenolic reactant present. Flash chromatography was performed and fractions of desired product were combined and evaporated to provide a yellow oil containing crystalline material. The product was recrystallized from pentane with cooling in dry ice to yield 3.73 g (71% yield) of product having a melting point of 75.5°–77° C. and the following structure confirmed by NMR and mass spectral analyses.

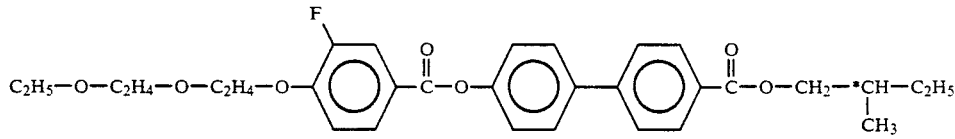

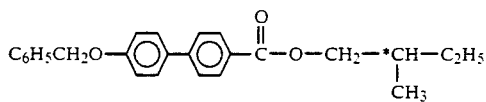

PART G—Preparation of (S)-2-methyl-1-butyl 4-hydroxy-4'-biphenylcarboxylate

In a 125 ml Parr bomb equipped with a magnetic stirrer were placed 960 mg (S)-2-methyl-1-butyl 4-benzyloxy-4'-biphenylcarboxylate, 200 mg 5% palladium on carbon, and 50 ml ethyl acetate. The bomb was purged with argon and pressurized with 500 psi hydrogen. After stirring at room temperature for one day, thin-layer-chromatographic analysis showed that considerable starting material remained. An additional 200 mg 5% palladium on carbon was carefully added, and the bomb was re-pressurized with 500 psi hydrogen. After stirring for one more day, TLC analysis showed that the reaction was complete. The reaction mixture was filtered through Celite and the solids were washed thoroughly with ethyl acetate. Evaporation of the solvent yielded white crystals which were recrystallized from hexanes at low temperature to yield 0.62 g (85%) of product, mp 111.5°–113° C., whose structure was confirmed by infrared, nuclear magnetic resonance, and mass spectral anaylses, as follows.

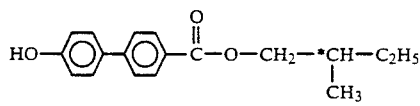

PART H—Preparation of 4-[(S)-2-methyl-1-butoxycarbonyl]-4'-biphenyl 3 fluoro-4-[2-(2-ethoxy ethoxy)-ethoxy]-benzoate Into a 250-ml, round-bottom flask equipped with a magnetic stirrer, were placed 2.82g (10.36 mmol) of 3-fluoro-4-[2-(ethoxyethoxy)-ethoxy]-benzoic acid and 2.8 g (9.8 mmol) of the phenolic reactant, (S)-2-methyl-1-butyl 4-hydroxy-4'-biphenylcarboxylate, . obtained respectively in the manners described in PARTS B and G of this example, 0.63 g (5.16 mmol) of catalyst 4-dimethylaminopyridine, and 2.8 g (14.61 mmol) of 1-(3-dimethylaminopropyl)-3-ethylcarbodiimide hydrochloride.

EXAMPLE 8

This example illustrates the preparation of 4-[(S)-2-methyl-1-butoxycarbonyl]-phenyl 4'-[2-(2-butoxyethoxy)ethoxy]-4-biphenyl-carboxylate.

PART A—Preparation of methyl 4'-[2-(2-butoxyethoxy)ethoxy]-4-biphenyl-carboxylate A mixture of 3.4 g (15 mmol) of methyl 4'hydroxy-4-biphenylcarboxylate, 3.6 g (160 mmol) of 1-bromo-2-(2-butoxyethoxy)-ethane, 4.2 g of powdered potassium carbonate and 300 mg of potassium iodide were heated in 35 mls of dimethylformamide for four hours at a temperature of from 125 to 130° C. The reaction mixture was poured slowly into 250 mls. of ice water and left stirring for one-half hour. The resulting precipitate was collected by filtration, washed with water and dried in a vacuum oven at 40° C. overnight, yielding 5.3 g of crude product. The crude product (2.9 g) was extracted three times with 100 mls of boiling hexane and the combined hexane solution was evaporated to a total volume of about 80 mls. A colorless solid (melting point, 90°–92° C.), weighing 2.1 g (72% yield) after standing for five hours at room temperature, was obtained. The mother liquid was concentrated to a volume of about 30 mls to provide an additional quantity of product in the amount of 0.26 g (9% yield). This portion, also a colorless solid, had a melting point of 91°–93° C. The following structure of the desired product was confirmed by TLC, IR, NMR and mass spectral analyses.

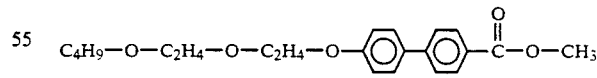

PART B—Preparation of 4'-[2-(2-butoxyethoxy)ethoxy]-4-biphenyl-carboxylic acid

A mixture of two grams (5.4 mmol) of the ester product prepared as described in PART A of this example, two mls of 50% aqueous sodium hydroxide, 30 mls of methanol and ten mls of water was heated on a steam bath. A homogeneous solution was obtained. A colorless solid was observed to precipitate from the solution as methanol was removed by heating. Fifty mls of water were added and the suspension was left on a steam bath for two hours. The reaction mixture was diluted with water to a total volume of 300 milliliters, acidified with concentrated hydrochloric acid, heated to boil, and cooled in an ice-water-salt bath. The colorless precipitate was collected by filtration, washed with water and dried in a vacuum oven at 60° C. overnight, to provide 1.87 g (97% yield) of product having a melting point of 174°–176° C. and the following structure.

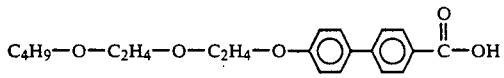

PART C—Preparation of (S)-2-methyl-1-butyl 4-hydroxybenzoate

A mixture of 20.7 g of 4-hydroxybenzoic acid (150 mmol), 40 g of (S)-2-methyl-1-butanol (454.5 mmol) and 0.5 g of p-toluene sulfonic acid in 150 mls of toluene was refluxed overnight with a Dean Stark trap. A homogeneous solution was obtained. The solvent and excess alcohol were removed by vacuum distillation and the residue was purified by column chromatography through 200 g of silica gel (60-200 mesh) using 2% methanol in methylene chloride as eluent. A total of 27.0 g (86% yield) of a light-yellow viscous liquid was collected. This liquid was vacuum distilled to provide 21.5 g (69% yield) of the desired product, having a boiling point of 140°–150° C. (0.2 mm) and the following structure.

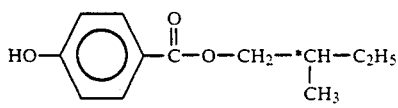

PART D—Preparation of 4-[(S)-2-methyl-1-butoxycarbonyl]-phenyl 4'-[2-(2-butoxyethoxy)ethoxy]-4-biphenyl-carboxylate To a 50-ml, round-bottom flask were added 1.284 g (3.58 mmol) of the acid product prepared as described in PART B of this example, 0.728 g (3.50 mmol) of the phenolic compound prepared as described in PART C of this example, 0.542 g (4.44 mmol) of catalyst 4-dimethylaminopyridine and 20 mls of methylene chloride. To this solution was added 0.833 g (4.35 mmol) of 1-(3)-dimethylaminopropyl)-3-ethylcarbodiimide hydrochloride. Thin layer chromatographic analysis of the reaction mixture after one hour showed substantial (approximately 50%) conversion. The reaction mixture was stirred overnight and filtered through a silica column. Additional fractions were obtained using methylene chloride and ether solvents through the column. Residues were obtained by evaporation of solvent in each instance and the residues were combined and recrystallized using a benzene/pentane mixture. The product was the ester having the following structure, confirmed by NMR and mass spectral analyses.

EXAMPLE 9

This example illustrates the preparation of 2-fluoro-4-[(S)-2-methyl-1-butoxycarbonyl]-phenyl 4'-[2-(2-butoxyethoxy)ethoxy]-4-biphenyl-carboxylate.

PART A—Preparation of (S)-2-methyl-1-butyl 3-fluoro-4-hydroxybenzoate

In a 250-ml, round-bottomed flask equipped with a heating mantle, magnetic stirrer, condenser and Dean Stark trap, were placed 2.5 g (16.0 mmol) of 3-fluoro-4-hydroxybenzoic acid, ten g (113.4 mmol) of (S)-2-methyl-1-butanol, 0.347 g of p-toluenesulfonic acid monohydrate and 100 mls of benzene. The reaction mixture was stirred overnight under reflux. The reaction mixture was extracted using saturated aqueous sodium bicarbonate. The organic phase was dried over sodium sulfate, filtered through cotton and evaporated to an oil. The product was purified by flash chromatography on silica gel with 3% diethyl ether in dichloromethane. Fractions containing the desired product were combined and evaporated to a pale-yellow oil. Analysis by NMR showed that considerable starting alcohol remained. The oil was placed under vacuum (at 70° C.) for two days. No alcohol was shown by gas chromatography to be present. The desired product was obtained in the amount of 2.39 g (66% yield) and had the following structure.

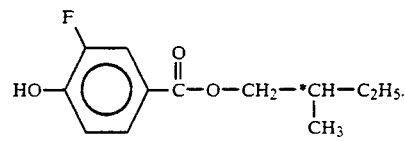

PART B—Preparation of 4'-[2-(2-butoxyethoxy)ethoxy]-4-biphenyl-carboxylic acid

Using the procedure set forth in PARTS A and B of EXAMPLE 8, the captioned carboxylic acid product was obtained.

PART C—Preparation of 2-fluoro-4-[(S)-2-methyl-1-butoxycarbonyl]-phenyl 4'-[2-(2-butoxyethoxy)ethoxy]-4-biphenyl-carboxylate To a 50-ml, round-bottom flask were added 1.037 g (4.58 mmol) of the phenolic compound obtained from the conduct of PART A of this example, 1.697 g (4.73 mmol) of the acid compound described in PART B of this example, 0.784 g (6.42 mmol) of catalyst 4-dimethylaminopyridine, and 15 mls of methylene chloride. After dissolution of the reactants, 1.039 g (5.42 mmol) of 1-(3-dimethylaminopropyl)-3-ethylcarbodiimide hydrochloride was added. The reaction mixture was stirred overnight and filtered through 20 g of silica. Using methylene chloride and ether solvents, additional fractions were obtained. Recovery of the fractions by solvent evaporation in each instance and combination of the fractions yielded a solid material which was recrys-

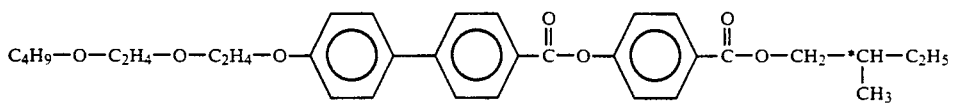

tallized from a benzene/hexane mixture and which had the following structure.

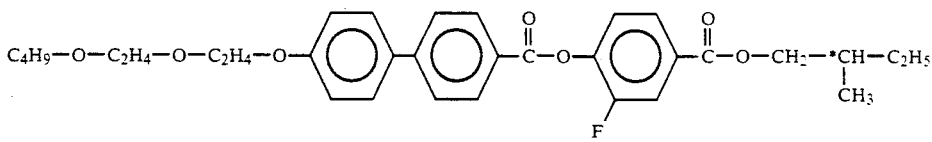

EXAMPLE 10

The phase transition temperatures of the liquid crystal compounds of EXAMPLES 1 to 9 were measured. For purposes of comparison, phase transition changes were recorded for the following control compounds which were synthesized using the methodology described in EXAMPLES 1 to 3, 7 and 8:

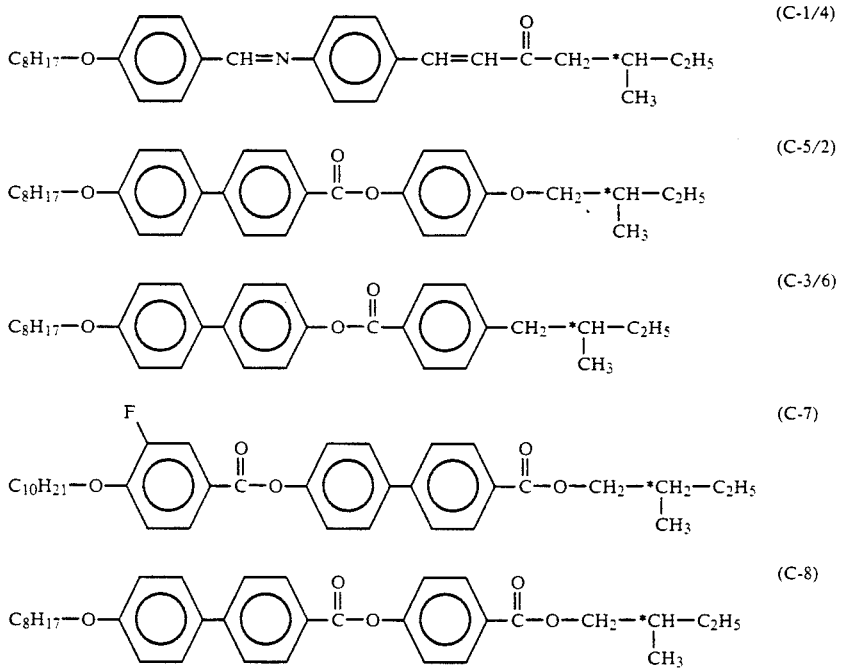

By inspection, it will be seen that the liquid crystal control compound of formula (C-1/4) contains the n-octyloxy group in place of the diether or triether group, respectively, of the compounds of EXAMPLES 1 and 4 of the invention. The control compound of formula (C-5/2) contains the n-octyloxy group in place of the diether or triether group in the compounds of EXAMPLES 5 and 2, respectively. Similarly, the control compound of formula (C-3/6) contains the n-octyloxy in place of the diether or triether group of the compounds of EXAMPLES 3 and 6, respectively. The control compounds of formulas (C-7) and (C-8) contain the n-decyloxy and n-octyloxy groups, respectively, in place of the triether groups of the compounds of EXAMPLES 7 and 8. Each of the compounds of EXAMPLES 1 to 9 (and the control compounds where applicable) was subjected to phase transition temperature measurement and observation, using differential scanning calorimetry and microscopic evaluation. Each sample was heated to assure that the compound was in an isotropic state and each phase transition and corresponding temperature was recorded as the sample was gradually cooled.

In TABLE 1, the observed phase transitions (in °C.) are reported, wherein K represents crystalline, $S_A$ represents smectic A, $S_C$ represents smectic C, $S_X$ represents an unidentified smectic phase, Ch represents cholesteric, and K represents crystalline.

TABLE 1

| Liquid Crystal Compound | Phase Transitions (°C.) |
|---|---|
| EXAMPLE 1 | $I \xrightarrow{75.6} S_A \xrightarrow{56.2} S_C \xrightarrow{42.2} K$ |
| EXAMPLE 4 | $I \xrightarrow{49.1} S_A \xrightarrow{24.1} S_C \xrightarrow{10.6} K$ |
| FORMULA (C-1/4) | $I \xrightarrow{120} S_A \xrightarrow{93} S_C \xrightarrow{75} S_I \xrightarrow{68} K$ |
| EXAMPLE 5 | $I \xrightarrow{154} S_A \xrightarrow{140} S_C \xrightarrow{95} K$ |
| EXAMPLE 2 | $I \xrightarrow{177} S_A \xrightarrow{105} S_C \xrightarrow{79} K$ |
| FORMULA (C-5/2) | $I \xrightarrow{188} S_A \xrightarrow{146} S_C \xrightarrow{106} S_X \xrightarrow{72} K$ |

TABLE 1-continued

| Liquid Crystal Compound | Phase Transitions (°C.) |
|---|---|
| EXAMPLE 3 | I $\xrightarrow{126}$ Ch $\xrightarrow{92}$ S$_A$ $\xrightarrow{76}$ S$_C$ $\xrightarrow{64}$ S$_X$ $\xrightarrow{57}$ K |
| EXAMPLE 6 | I $\xrightarrow{110}$ Ch $\xrightarrow{68}$ S$_A$ $\xrightarrow{62}$ S$_C$ $\xrightarrow{44}$ K |
| FORMULA (C-3/6) | I $\xrightarrow{161}$ Ch $\xrightarrow{141}$ S$_A$ $\xrightarrow{91}$ S$_C$ $\xrightarrow{87}$ S$_X$ $\xrightarrow{43}$ K |
| EXAMPLE 7 | I $\xrightarrow{94}$ Ch $\xrightarrow{86}$ S$_A$ $\xrightarrow{72}$ S$_C$ $\xrightarrow{24}$ K |
| FORMULA (C-7) | I $\xrightarrow{152}$ S$_A$ $\xrightarrow{82}$ S$_C$ $\xrightarrow{52}$ K |
| EXAMPLE 8 | I $\xrightarrow{129}$ S$_A$ $\xrightarrow{90}$ S$_C$ $\xrightarrow{-4}$ K |
| FORMULA (C-8) | I $\xrightarrow{187}$ S$_A$ $\xrightarrow{141}$ S$_C$ $\xrightarrow{63}$ S$_X$ $\xrightarrow{32}$ K |
| EXAMPLE 9 | I $\xrightarrow{84}$ Ch $\xrightarrow{80}$ S$_A$ $\xrightarrow{45}$ S$_C$ $\xrightarrow{3}$ K |

From inspection of the transition temperatures reported in TABLE 1, it will be seen that the presence of a diether or triether tail moiety produced a general lowering in the observed temperatures of phase transition, relative (where applicable) to the corresponding control compound.

The temperature at which the onset of the smectic C phase was observed was recorded for each of the compounds of EXAMPLES 1 to 9 and the control compounds, where applicable, and is included in the transition temperature data reported in TABLE 1. In TABLE 2, is reported the amount by which the onset temperature was lowered by the presence of the diether or triether tail moiety in the compounds of EXAMPLES 1 to 8, relative to the corresponding control compound having the n-octyloxy or n-decyloxy tails.

TABLE 2

| Liquid Crystal Compound | Tail | Smectic C Onset (°C.) | Lowering of Onset (°C.) |
|---|---|---|---|
| Formula (C-1/4) | Octyloxy | 93 | — |
| EXAMPLE 1 | Diether | 56.2 | 36.8 |
| EXAMPLE 4 | Triether | 24.1 | 68.9 |
| Formula (C-5/2) | Octyloxy | 146 | — |
| EXAMPLE 5 | Diether | 140 | 6 |
| EXAMPLE 2 | Triether | 105 | 41 |
| Formula (C-3/6) | Octyloxy | 91 | — |
| EXAMPLE 3 | Diether | 76 | 15 |
| EXAMPLE 6 | Triether | 62 | 29 |
| Formula (C-7) | Decyloxy | 82 | — |
| EXAMPLE 7 | Triether | 72 | 10 |
| Formula (C-8) | Octyloxy | 141 | — |
| EXAMPLE 8 | Triether | 90 | 51 |

What is claimed is:

1. A smectic liquid crystal compound having the formula $$R^1+OR^2\!\!\to_aO+R^3\!\!\to_bZ\!-\!R^*$$

wherein $R^1$ is alkyl or alkoxyalkyl; $R^2$ and $R^3$ are each alkylene; a is an integer of at least one; b is zero or one; $R^*$ is an optically active group containing an asymmetric center; and —Z— is an organic divalent core radical having parallel or coaxially extending bonds at the terminal ends thereof, the core radical having an axial ratio of at least two and being characterized by an essentially rigid and flat molecular structure, said core radical having the formula

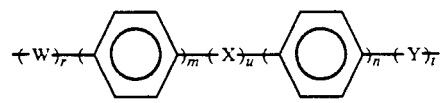

wherein each of X and Y is a divalent radical selected

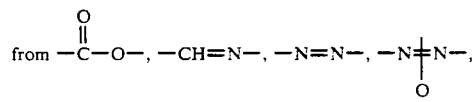

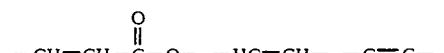

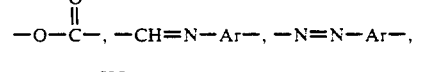

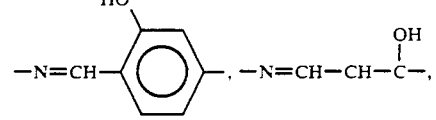

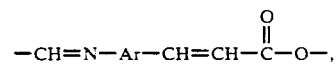

where Ar is p-phenylene or p,p'-biphenylene wherein each of u and t is zero or one, the sum of u and t is one or two; each of m and n is zero or an integer one or two, and the sum of n and m is from one to three; W is a divalent radical selected from

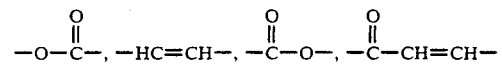

and

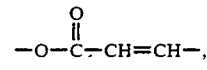

and r is zero or one.

2. The smectic liquid crystal compound of claim 1 wherein $R^1$ is alkyl.

3. The smectic liquid crystal compound of claim 1 wherein $R^1$ is alkoxyalkyl.

4. The smectic liquid crystal compound of claim 1 wherein b is zero.

5. The smectic liquid crystal compound of claim 4 wherein $R^1$ is alkyl of from 1 to about 4 carbon atoms.

6. The smectic liquid crystal compound of claim 5 wherein $R^2$ is methylene or 1,2-ethylene.

7. The smectic liquid crystal compound of claim 6 wherein $R^2$ is 1,2-ethylene and a is one.

8. The smectic liquid crystal compound of claim 6 wherein $R^2$ is 1,2-ethylene and a is two.

9. The smectic liquid crystal compound of claim 1 wherein said optically active group has the formula $$+O\frac{1}{j}+CH_2\frac{1}{p}\overset{R^4}{\underset{|}{CH}}-R^5$$

wherein j is zero or one, p is zero or an integer from 1 to 8 and each of $R^4$ and $R^5$ is alkyl, halogen, alkoxy or alkoxyalkyl, provided that $R^4$ and $R^5$ are different from each other.

10. The smectic liquid crystal compound of claim 9 wherein p is zero or one and each of $R^4$ and $R^5$ are dissimilar normal alkyl groups.

11. The smectic liquid crystal compound of claim 10 wherein p is one and $R^4$ and $R^5$ are methyl and ethyl, respectively.

12. The smectic liquid crystal compound of claim 1 wherein r is zero, m is two, X is $$\overset{O}{\underset{\|}{-C-O-}},$$

n is one, Y is $$\overset{O}{\underset{\|}{-C-O-}}$$

and t is one.

13. The smectic liquid crystal compound of claim 12 wherein said optically active group, $R^*$, has the formula $$-CH_2-\overset{R^4}{\underset{|}{^*CH}}-R^5$$

wherein $R^4$ and $R^5$ are dissimilar normal alkyl groups.

14. The smectic liquid crystal compound of claim 13 wherein $R^4$ is methyl and $R^5$ is ethyl.

15. The smectic liquid crystal compound of claim 14 wherein b is zero.

16. The smectic liquid crystal compound of claim 15 wherein $R^1$ is alkyl of from 1 to about 14 carbon atoms.

17. The smectic liquid crystal compound of claim 16 wherein $R^2$ is 1,2-ethylene and a is two.

18. The smectic liquid crystal compound of claim 17 wherein $R^1$ is n-butyl.

19. A smectic liquid crystal compound having the formula $$R^1+OR^2\frac{1}{a}O-\bigcirc-CH=N-\bigcirc-CH=CH-\overset{O}{\underset{\|}{C}}-O-R^*$$

wherein $R^1$ is alkyl or alkoxyalkyl; $R^2$ is alkylene; a is an integer of at least one; and $R^*$ is an optically active group containing an asymmetric center.

20. The smectic liquid crystal compound of claim 19 wherein $R^1$ is alkyl of from one to four carbon atoms.

21. The smectic liquid crystal compound of claim 20 wherein $R^2$ is 1,2-ethylene.

22. The smectic liquid crystal compound of claim 21 wherein a is one and $R^1$ is n-butyl.

23. The smectic liquid crystal compound of claim 21 wherein a is two and $R^1$ is ethyl.

24. A smectic liquid crystal compound having the formula $$R^1+OR^2\frac{1}{a}O-\bigcirc-\bigcirc-\overset{O}{\underset{\|}{C}}-O-\bigcirc-R^*$$

wherein $R^1$ is alkyl or alkoxyalkyl; $R^2$ is alkylene; a is an integer of at least one; and $R^*$ is an optically active group containing an asymmetric center.

25. The smectic liquid crystal compound of claim 24 wherein $R^2$ is 1,2-ethylene.

26. The smectic liquid crystal compound of claim 25 wherein a is one and $R^1$ is n-butyl.

27. The smectic liquid crystal compound of claim 26 wherein said optically active group has the formula $$+O\frac{1}{j}+CH_2\frac{1}{p}\overset{R^4}{\underset{|}{CH}}-R^5$$

wherein j is zero or one, p is zero or an integer from 1 to 8 and each of $R^4$ and $R^5$ is alkyl, halogen, alkoxy or alkoxyalkyl, provided that $R^4$ and $R^5$ are different from each other.

28. The smectic liquid crystal compound of claim 27 wherein j is one, p is one, $R^4$ is methyl and $R^5$ is ethyl.

29. The smectic liquid crystal compound of claim 25 wherein a is two and $R^1$ is ethyl.

30. The smectic liquid crystal compound of claim 29 wherein said optically active group has the formula $$+O\frac{1}{j}+CH_2\frac{1}{p}\overset{R^4}{\underset{|}{CH}}-R^5$$

wherein j is zero or one, p is zero or an integer from 1 to 8 and each of $R^4$ and $R^5$ is alkyl, halogen, alkoxy or alkoxyalkyl, provided that $R^4$ and $R^5$ are different from each other.

31. The smectic liquid crystal compound of claim 30 wherein j is one, p is one, $R^4$ is methyl and $R^5$ is ethyl.

32. A smectic liquid crystal compound having the formula $$R^1+OR^2\frac{1}{a}O-\bigcirc-\bigcirc-O-\overset{O}{\underset{\|}{C}}-\bigcirc-R^*$$

wherein $R^1$ is alkyl or alkoxyalkyl; $R^2$ is alkylene; a is an integer of at least one; and $R^*$ is an optically active group containing an asymmetric center.

33. The smectic liquid crystal compound of claim 32 wherein $R^2$ is 1,2-ethylene.

34. The smectic liquid crystal compound of claim 33 wherein a is one and $R^1$ is n-butyl.

35. The smectic liquid crystal compound of claim 34 wherein said optically active group has the formula $$+O\frac{1}{j}+CH_2\frac{1}{p}\overset{R^4}{\underset{|}{CH}}-R^5$$

wherein j is zero or one, p is zero or an integer from 1 to 8 and each of $R^4$ and $R^5$ is alkyl, halogen, alkoxy or alkoxyalkyl, provided that $R^4$ and $R^5$ are different from each other.

36. The smectic liquid crystal compound of claim 35 wherein j is zero, p is one, $R^4$ is methyl and $R^5$ is ethyl.

37. The smectic liquid crystal compound of claim 33 wherein a is two and $R^1$ is ethyl.

38. The smectic liquid crystal compound of claim 37 wherein said optically active group has the formula

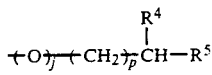

wherein j is zero or one, p is zero or an integer from 1 to 8 and each of $R^4$ and $R^5$ is alkyl, halogen, alkoxy or alkoxyalkyl, provided that $R^4$ and $R^5$ are different from each other.

39. The smectic liquid crystal compound of claim 38 wherein j is zero, p is one, $R^4$ is methyl and $R^5$ is ethyl.

* * * * *